United States Patent
Rupprath et al.

(10) Patent No.: US 9,013,329 B2
(45) Date of Patent: Apr. 21, 2015

(54) LIGHTING DEVICE FOR IDENTIFYING AND MARKING TRAFFIC AREAS OF AIRPORTS

(75) Inventors: Bernhard Rupprath, Lippstadt (DE); Nikolaus Decius, Lippstadt (DE); Bjorn Abel, Lippstadt (DE)

(73) Assignee: Hella KGAA Hueck & Co., Lippstadt (DE)

( * ) Notice: Subject to any disclaimer, the term of this patent is extended or adjusted under 35 U.S.C. 154(b) by 124 days.

(21) Appl. No.: 13/595,095

(22) Filed: Aug. 27, 2012
(Under 37 CFR 1.47)

(65) Prior Publication Data
US 2014/0070964 A1    Mar. 13, 2014

Related U.S. Application Data

(63) Continuation of application No. PCT/EP2011/052975, filed on Mar. 1, 2011.

(30) Foreign Application Priority Data

Mar. 1, 2010 (EP) .................................. 10155012

(51) Int. Cl.
*B64F 1/18* (2006.01)
*B64F 1/20* (2006.01)
*H05B 33/08* (2006.01)
*B64F 1/00* (2006.01)

(52) U.S. Cl.
CPC .............. *B64F 1/20* (2013.01); *H05B 33/0815* (2013.01); *B64F 1/002* (2013.01)

(58) Field of Classification Search
USPC ........... 340/952, 506, 3.1; 315/291, 294, 297, 315/318, 362
See application file for complete search history.

(56) References Cited

U.S. PATENT DOCUMENTS

| | | | |
|---|---|---|---|
| 7,471,051 B1 * | 12/2008 | Wacknov et al. | 315/291 |
| 7,567,768 B2 | 7/2009 | Moore et al. | |
| 2005/0253929 A1 | 11/2005 | Kock | |

(Continued)

FOREIGN PATENT DOCUMENTS

| | | |
|---|---|---|
| EP | 1499165 A2 | 1/2005 |
| EP | 1860922 A1 | 11/2007 |
| WO | 2008112820 A2 | 9/2008 |
| WO | 20008112820 A2 | 9/2008 |
| WO | 2008137984 A1 | 11/2008 |
| WO | 20008137984 A1 | 11/2008 |
| WO | 2009138104 A1 | 11/2009 |
| WO | 20110107452 A1 | 9/2011 |

OTHER PUBLICATIONS

International Search Report for PCT/EP2011/052975 with a date of mailing of Aug. 4, 2011.

*Primary Examiner* — Daryl Pope
(74) *Attorney, Agent, or Firm* — Yakov Sidorin; Quarles & Brady LLP

(57) ABSTRACT

A lighting device, capable of identifying and marking traffic areas of airports, comprises at least one semiconductor lamp and an electronic control circuit, which is connectable to an electrical AC supply network with constant current feed. For controlling the operation of the semiconductor lamp, the control circuit has a rectifier, which is connectable without a transformer to the electrical AC supply network. It further has an internal power supply, which is connected to the rectifier, for supplying the semiconductor lamp with an electric direct current. Furthermore, the voltage supply device (3) having electronic power factor correction means, by means of which voltage and current can be kept in phase in all operating states of the lighting device (1). It furthermore re-adjusts the input voltage from the electrical AC supply network to allow the current predefined on the AC supply network to flow in the event of a small power demand of the electronic control circuit.

7 Claims, 1 Drawing Sheet

(56) References Cited

U.S. PATENT DOCUMENTS

| | | |
|---|---|---|
| 2008/0129267 A1 | 6/2008 | Lenz |
| 2008/0138104 A1 | 6/2008 | Moore et al. |
| 2008/0316781 A1 | 12/2008 | Liu |
| 2010/0123403 A1* | 5/2010 | Reed .............................. 315/193 |
| 2010/0308733 A1* | 12/2010 | Shao .............................. 315/119 |

* cited by examiner

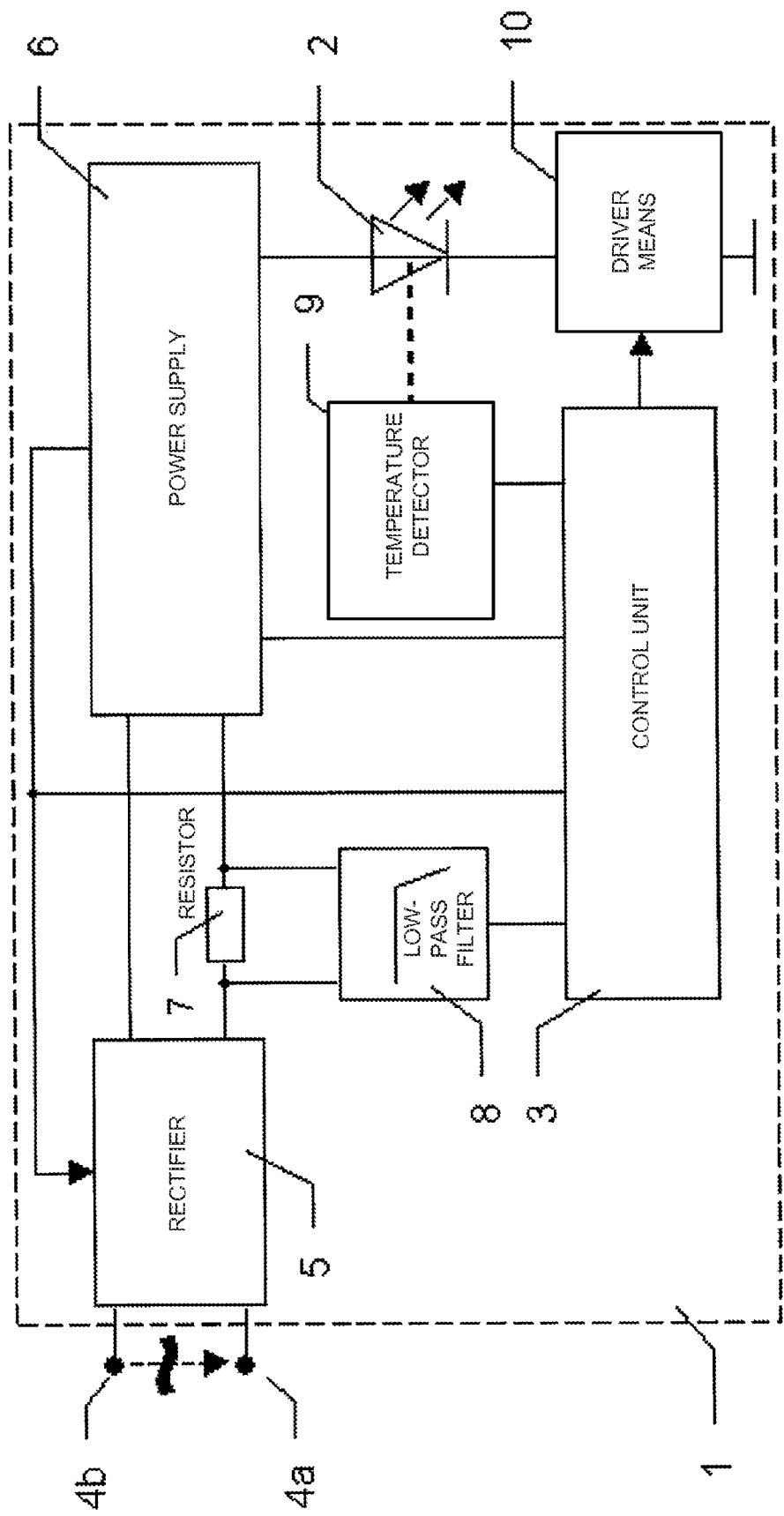

LIGHTING DEVICE FOR IDENTIFYING AND MARKING TRAFFIC AREAS OF AIRPORTS

CROSS-REFERENCE TO RELATED APPLICATIONS

This application is a continuation of the pending International patent Application No. PCT/EP2011/052975 filed on Mar. 1, 2011, which designates the United States and claims priority from and benefit of the European Patent Application No. 10155012.7 filed on Mar. 1, 2010. Disclosure of each of the above-mentioned patent applications is incorporated herein by reference in its entirety.

TECHNICAL FIELD

The invention relates to a lighting device for identifying and marking traffic areas of airports such as, for example, runways, landing strips, and taxiways.

BACKGROUND ART

Lighting devices, which are capable of identifying and marking traffic areas of airports and emitting signals, have been utilized. For example, runways and landing strips as well as taxiways of airports have been employing lighting devices that can mark, for example, the beginning, the end, and the middle of a runway and, optionally, individual sections of the runway as well. Halogen lamps, frequently used in such lighting devices, have a typical service life of about 1,000 to about 1,500 hours and therefore, in practice, have to be replaced relatively frequently. A further disadvantage of halogen lamps is that they consume a relatively large amount of power during their operation.

Replacing the halogen lamps with lamps based on semiconductors has been described as related to lighting devices capable of identifying and marking traffic areas. EP 0 898 683 B1 and EP 0 898 684 B1, for example, disclose lighting devices that directly emit visible light. In order to reduce the power consumption and the maintenance expenditure, the light sources are implemented as semiconductor elements, in particular as light-emitting diodes. Light-emitting diodes have a substantially lower thermal power loss and simultaneously a longer service life and greater reliability in comparison to halogen lamps. In order to be able to vary the intensity of light emission of the semiconductor elements in a controlled manner, a corresponding control unit is typically provided. Further lighting devices for identifying and marking traffic areas of airports, in which semiconductor elements are used as light sources, are described, for example, in WO 2009/077010 A1, WO 97/44614 A1, or WO 97/44612 A1.

One disadvantage of the lighting devices, of the related art, used for identifying and marking traffic areas of airports is that an additional transformer is required to adapt the control circuit (provided for the operation of the at least one semiconductor element) to the supply network (the AC network). The presence provision of this additional transformer necessitates higher weight of the lighting device and increases the production costs. In addition, a special construction and connection technology required to implement the resulting lighting device, which leads to substantial structural expenditure necessitated by stringent requirements for the vibration and shock resistance.

SUMMARY OF THE INVENTION

Embodiments of the invention provide a lighting device configured to identify and mark traffic areas of airports. Such lighting device is characterized by increased reliability, simplified and more cost-effective production, and has a lower weight than its currently available counterparts. The lighting device requires smaller installation space in comparison to the lighting devices of the related art.

In an embodiment, a lighting device has a rectifier means, which is connectable without a transformer to the electrical AC supply network with predefined constant current feed. It further has an internal power supply device, which is connected to the rectifier means, to supply at least one semiconductor lamp with an electric direct current. The internal power supply device further has electronic power factor correction means, with which voltage and current can be kept in phase in all operating states of the lighting device, and which is preferably configured to re-adjust the input voltage from the electrical AC supply network to allow the constant current, predefined on the AC supply network, to flow in the event of a small power demand of the electronic control circuit.

The electronic control circuit of the lighting device advantageously does not require a network-side transformer, because the electronic power factor correction means of the power supply device are configured to ensure that the current and the voltage are in phase in all operating states of the lighting device. The current predefined on the network side can thus also flow in the event of a small power demand of the electronic control circuit, for which purpose the input-side terminal voltage is readjusted accordingly. The lighting device advantageously allows efficient, transformer-less, and therefore cost-effective activation of the at least one semiconductor lamp or light source (which preferably includes a light-emitting diode) from an AC supply network with constant current feed. The activation circuit adapted to for activate the at least one semiconductor lamp behaves on the network side like an ohmic consumer and is, therefore, adapted as an easy and simple replacement of a halogen lamp. In addition, the structural and connection technology linked to the use of an input-side transformer and requiring a substantial structural expenditure, as known from the related art, can also be advantageously dispensed with. The control circuit of an embodiment of the lighting device is simpler, longer-lived, more flexible, more cost-efficient, and more reliable than a solution of the related art. IN one implementation, the lighting device of the invention include multiple semiconductor lamps or light source, the operation of which is effectuated and coordinated by means of a single electronic control circuit. Because of its compact construction, an embodiment of the lighting device is particularly suitable for subfloor installation, in which only a small installation space is available. In a specific embodiment, the rectifier means includes a synchronous rectifier means.

In one embodiment, the control circuit includes a central control unit and a driver means, by means of which the brightness of the at least one semiconductor lamp can be set in a controlled manner. A high operational reliability of the lighting device can thus be obtained and a high flexibility can be achieved.

In one implementation, in order to be able to set and, optionally, vary the brightness of the semiconductor lamp in a simple manner, a control circuit has a current detection means for detecting the current flowing during the operation of the lighting device. The current detection means can include a low-pass filter adapted to transmit, substantially without attenuation, a signal at frequencies below a fixed limiting frequency, while in contrast attenuating signal components at higher frequencies above the limiting frequency.

The current flowing during the operation of the lighting device can thus be measured particularly reliably and precisely.

In a specific embodiment, the lighting device contain a transceiver means configured for establishing data communication of the lighting device with an external control center. The transceiver means can be configured for data communication via the AC supply network. Because the lighting device is implemented as transformer-less, it is possible that data (for example, activation data or status data) be transmitted via the electrical AC supply network from the control center of the airport to the lighting device and/or back from the lighting device to the control center of the airport, respectively.

In a preferred embodiment, the activation circuit has a temperature detection means, which is capable of detecting the temperature of the at least one semiconductor lamp. By measuring the temperature of the semiconductor lamp, which is provided to the control unit as an input signal—in particular in the event of an elevated temperature of the semiconductor lamp, at which the power loss is increased—an optical compensation by adaptation of the light output of the at least one semiconductor lamp is advantageously possible.

BRIEF DESCRIPTION OF THE DRAWINGS

In the following, the invention will be described by way of example, without limitation of the general inventive concept, in reference to the embodiments and the drawings.

FIG. 1 shows a schematic circuit of a lighting device.

While embodiments of the invention are described in reference to specific examples, such embodiments can be appropriately modified within the scope of the invention that is not limited to the particular disclosed embodiments. The scope of the intention is intended to cover all modifications, equivalents and alternatives falling within the spirit and scope of the present invention as defined by the appended claims.

DETAILED DESCRIPTION

FIG. 1 shows a schematic circuit of an embodiment of the lighting device. In this exemplary embodiment, the lighting device 1 comprises a semiconductor lamp or light source 2, which preferably includes a light-emitting diode (LED), and an electronic control circuit for activating the semiconductor lamp 2. The electronic control circuit has two terminal means 4a, 4b, with the aid of which the lighting device 1 is connectable to an electrical AC supply network. Furthermore, the electronic control circuit has a rectifier means 5, an internal power supply device 6, which is connected to the rectifier means 5, for supplying the semiconductor lamp 2 with electric direct current, and a central control unit 3. The central control unit 3 preferably includes a microcontroller or an application-specific electronic circuit. The rectifier means 5 is preferably implemented as a synchronous rectifier means, but can include other known rectifier arrangements. The internal power supply device 6 has electronic power factor correction means, which is configured to ensure during the operation of the lighting device 1 that the current and the voltage are in phase in all operating states. The current predefined on the network side can thus also flow in the event of a low power demand of the electronic control circuit, for which purpose the input-side terminal voltage is accordingly readjusted.

Furthermore, a measuring resistor 7 is provided, by means of which the strength of the instantaneously flowing electrical current via a low-pass filter 8 is measured and provided as an analog input signal to the central control unit 3. A mean current value is determined in the central control unit 3 from the measured currents according to the root mean square method (RMS). In this manner, the desired brightness of the semiconductor lamp 2 can be determined, and the brightness of the semiconductor lamp 2 can be predefined and set through various constant currents and/or cyclic operation. In the event of an interruption of the circuit, a network-side measuring unit recognizes a change of the terminal voltage and can detect a malfunction in this manner.

The central control unit 3 activates a driver means 10, which authorizes the current flow through the semiconductor lamp 2, via a digital output. Furthermore, the dimension of the current flowing through the semiconductor lamp 2 is predefined by means of the central control unit 3, which is connected to the internal power supply device 6. The electronic control circuit also comprises a temperature detection means 9, by means of which the temperature of the semiconductor lamp 2 can be detected during the operation of the lighting device 1. An increase of the temperature of the semiconductor lamp 2 is accompanied by higher electrical power loss. The measured temperature is provided to the central control unit 3 as an analog input signal. The operation of the semiconductor lamp 2 can be optically compensated (in that the light output of the semiconductor lamp 2 is adapted accordingly) by temperature adjustment, the temperature being measure with the aid of the temperature detection means.

With the aid of the electronic control circuit described here, the lighting device 1 can be operated without a transformer on a typical AC supply network. The costly and heavy input-side transformer (which is always present in typical lighting devices employing semiconductor lamps) can therefore be advantageously omitted. In addition, the structural and connection technology linked to the use of an input-side transformer can also be dispensed with, which requires a substantial structural expenditure in the event of high requirements for the vibration and shock resistance. The control circuit described here of the lighting device 1 for activating the at least one semiconductor light source 2 behaves on the network side like an ohmic consumer and can, therefore, advantageously and simply replace a halogen lamp that is frequently used in typical lighting devices for identifying and marking traffic areas of airports.

In addition, the lighting device 1 can include a transceiver means, which is configured to establish data communication between the lighting device 1 and an external control center of the airport. The transceiver means can be configured for data communication via the AC supply network. Because the lighting device 1 is implemented as transformer-less, it is advantageously possible that data (for example, activation data or status data) can be transmitted via the electrical supply network from the control center of the airport to the lighting device or from the lighting device to the control center of the airport, respectively. By dispensing with an input-side transformer, the communication via the AC supply network is less complex, since such a transformer can have a negative effect on the communication speed.

It will be appreciated to those skilled in the art having the benefit of this disclosure that this invention is believed to provide airport lighting devices. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 lighting device
2 semiconductor lamp
3 control unit
4a, 4b terminal means
5 rectifier means
6 power supply device
7 measuring resistor
8 low-pass filter
9 temperature detection means
10 driver means

What is claimed is:

1. A lighting device configured to identify and mark traffic areas of airports, said lighting device comprising:
   at least one semiconductor light source; and
   an electronic control circuit, configured to be operably connected to an electrical AC supply network with constant current feed, said electronic control circuit being adapted to control operation of the at least one semiconductor light source,
   wherein said electronic control circuit comprises:
      a rectifier configured to be operably connected, to the electrical AC supply network,
      an internal power supply device operably connected to said rectifier and adapted to supply the at least one semiconductor light source with direct electric current,
      the internal power supply device having an electronic power factor correction means, wherein said electronic power factor correction means is adapted
         (i) to keep voltage and current received by said internal power supply from the electrical AC supply network in phase in all operating states of the lighting device, and
         (ii) to re-adjust said voltage from the electrical AC supply network to allow said current predefined by the AC supply network to flow in an event of a small power demand of the electronic control circuit,
      a measuring device at a load side of the rectifier configured to generate an analog input signal, wherein said analog input signal is representative of strength of said current, and
      a control unit operably connected to said measuring device and configured
         to receive said analog input signal,
         to define desired brightness of the semiconductor light source based on said analog input signal, and
         to activate a driver means defining a current flow through said semiconductor light source.

2. The lighting device according to claim 1, wherein the rectifier means includes a synchronous rectifier means.

3. The lighting device according to claim 1, wherein the electronic control circuit has current detection means configured to detect current flowing during the operation of the lighting device.

4. The lighting device according to claim 3, wherein the current detection means comprises a low-pass filter.

5. The lighting device according to claim 1, wherein the electronic control circuit has a temperature detection means adapted to detect temperature of the semiconductor light source.

6. The lighting device according to claim 1, further comprising a transceiver means configured to establish data communication between the lighting device and an external control center.

7. The lighting device according to claim 6, wherein the transceiver means is configured to establish data communication via the AC supply network.

* * * * *